(12) United States Patent
Estes

(10) Patent No.: US 7,991,623 B2
(45) Date of Patent: Aug. 2, 2011

(54) SYSTEM AND METHODS FOR PROVIDING ANCILLARY SERVICES IN A DELIVERY SYSTEM USING ICONS

(75) Inventor: Jacquelynn Estes, Warrenton, VA (US)

(73) Assignee: United States Postal Service, Washington, DC (US)

( * ) Notice: Subject to any disclaimer, the term of this patent is extended or adjusted under 35 U.S.C. 154(b) by 988 days.

(21) Appl. No.: 10/344,725

(22) PCT Filed: Sep. 6, 2001

(86) PCT No.: PCT/US01/27565
§ 371 (c)(1), (2), (4) Date: Feb. 14, 2003

(87) PCT Pub. No.: WO02/21392
PCT Pub. Date: Mar. 14, 2002

(65) Prior Publication Data
US 2004/0049400 A1 Mar. 11, 2004

Related U.S. Application Data

(60) Provisional application No. 60/231,307, filed on Sep. 8, 2000.

(51) Int. Cl.
*G06Q 10/00* (2006.01)
*G06F 17/60* (2006.01)

(52) U.S. Cl. .................. 705/1; 364/478.01
(58) Field of Classification Search ............... 705/28, 705/29, 1
See application file for complete search history.

(56) References Cited

U.S. PATENT DOCUMENTS

| 5,153,842 | A | 10/1992 | Dlugos, Sr. et al. | |
|---|---|---|---|---|
| 5,703,783 | A * | 12/1997 | Allen et al. | 700/213 |
| 6,508,365 | B1 * | 1/2003 | Cacace-Bailey et al. | 209/584 |
| 6,994,253 | B2 * | 2/2006 | Miller et al. | 235/385 |
| 7,028,049 | B1 * | 4/2006 | Shelton | 707/104.1 |
| 2001/0042007 | A1 * | 11/2001 | Klingle | 705/14 |
| 2003/0236757 | A1 * | 12/2003 | Sadler et al. | 705/400 |
| 2004/0128207 | A1 * | 7/2004 | Ray | 705/26 |

OTHER PUBLICATIONS

Joe Lubenow. Target Marketing Philadelphia: Aug. 1997. vol. 20, Iss. 8; p. 50 (2 pages).*

* cited by examiner

*Primary Examiner* — Matthew S Gart
*Assistant Examiner* — Garcia Ade
(74) *Attorney, Agent, or Firm* — Finnegan, Henderson, Farabow, Garrett & Dunner, LLP

(57) ABSTRACT

A method and system for providing ancillary services consistent with the invention includes placing an icon on an item, the icon corresponding to an ancillary service. Once the icon is placed on the item, the item is sent through a delivery system to a first address plant. Upon receiving an indication that the item cannot be delivered to a recipient at a first address, the ancillary service corresponding to the icon on the item is performed.

19 Claims, 4 Drawing Sheets

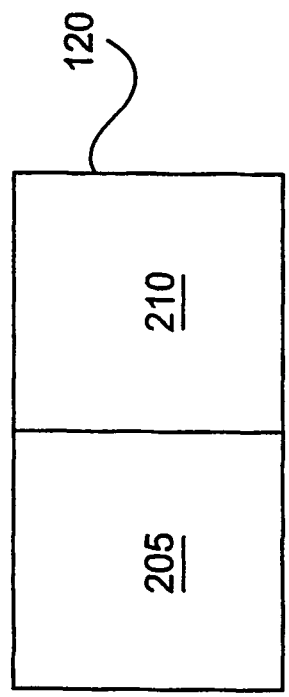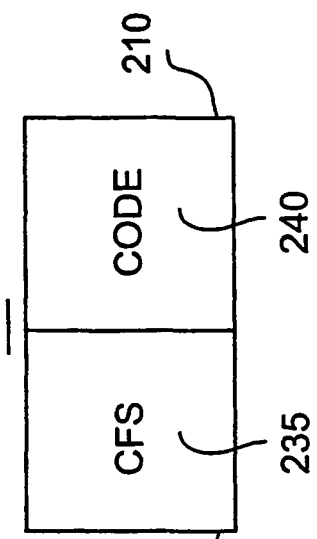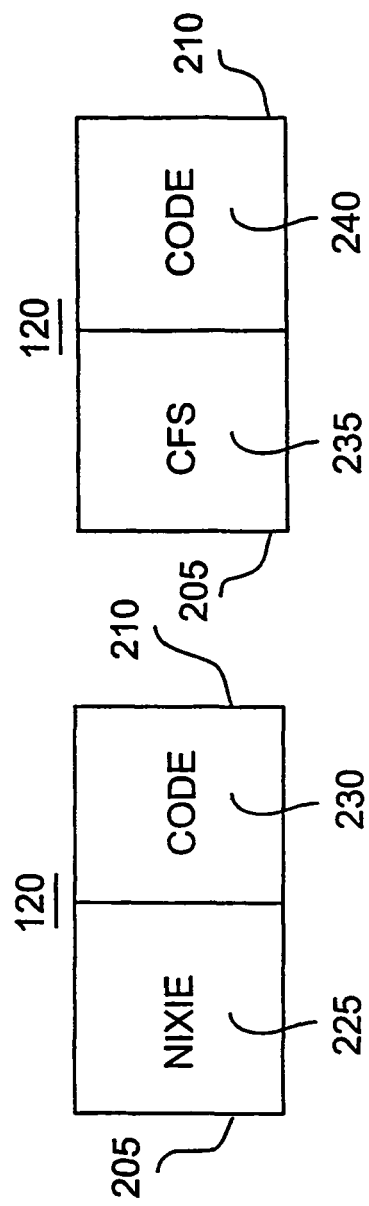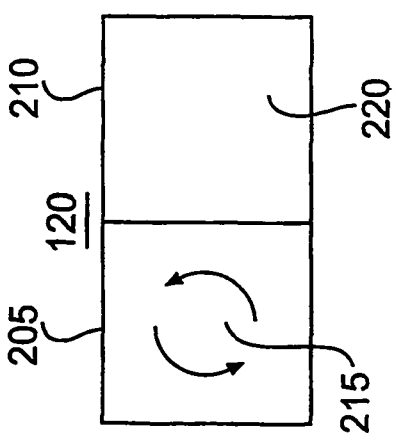

SYSTEM AND METHODS FOR PROVIDING ANCILLARY SERVICES IN A DELIVERY SYSTEM USING ICONS

RELATED APPLICATION

Under provisions of 35 U.S.C. §119(e), the Applicants claims the benefit of U.S. provisional application No. 60/231, 307, filed Sep. 8, 2000, which is incorporated herein by reference.

DESCRIPTION OF THE INVENTION

1. Technical Field

The present invention relates to the field of providing ancillary services. More particularly, the present invention, in various specific embodiments, involves methods and systems directed to providing ancillary services in a delivery system in a simplified manner, communicating simplified instructions.

2. Background

The need to efficiently provide ancillary services in a delivery system has become a common need for many organizations. More specifically, efficiently providing recycling services, undeliverable item services, and computerized forwarding services has become a critical service for many delivery system operators. This is because in an increasingly competitive environment, meeting and exceeding the expectations of those who receive a service is essential for a service provider.

One solution to the ancillary services problem is for the sender or delivery system operator to print words comprising a phrase requesting an ancillary service on an item. For example, the sender or delivery system operator can use a three word phrase such as "forwarding service requested" or "return service requested". Based on the phrase or, phrases, the delivery system operator can provide an ancillary forwarding service or return service involving a complex set of procedures. Description of procedures for performing these services, however, do not necessarily have intuitive meaning. The rules to achieve the ancillary service results are complicated in most instances, and delivery system operators have difficulty correctly implementing them. Accordingly, efficiently providing ancillary services in a delivery system remains an elusive goal. Thus, there remains a need for efficiently providing ancillary services in a delivery system. In addition, there remains a need for efficiently providing ancillary services in a simplified manner, communicating simplified instructions.

SUMMARY OF THE INVENTION

In accordance with the current invention, an ancillary services method and system are provided that avoid the problems associated with prior art ancillary services systems as discussed herein above.

In one aspect, a method for providing ancillary services consistent with the invention includes sending an item through a delivery system to a first address plant, receiving an indication that the item cannot be delivered to a recipient at a first address, determining if an icon corresponding to an ancillary service is present on the item, and performing the corresponding ancillary service if the item contains the icon.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings:

FIG. 2A is a diagram of the general format of an icon consistent with the present invention;

FIG. 2B is a diagram of a recycling icon consistent with the present invention;

FIG. 2C is a diagram of a NIXIE icon consistent with the present invention;

FIG. 2D is a diagram of a computerized forwarding service icon consistent with the present invention;

DETAILED DESCRIPTION

Figure 1:
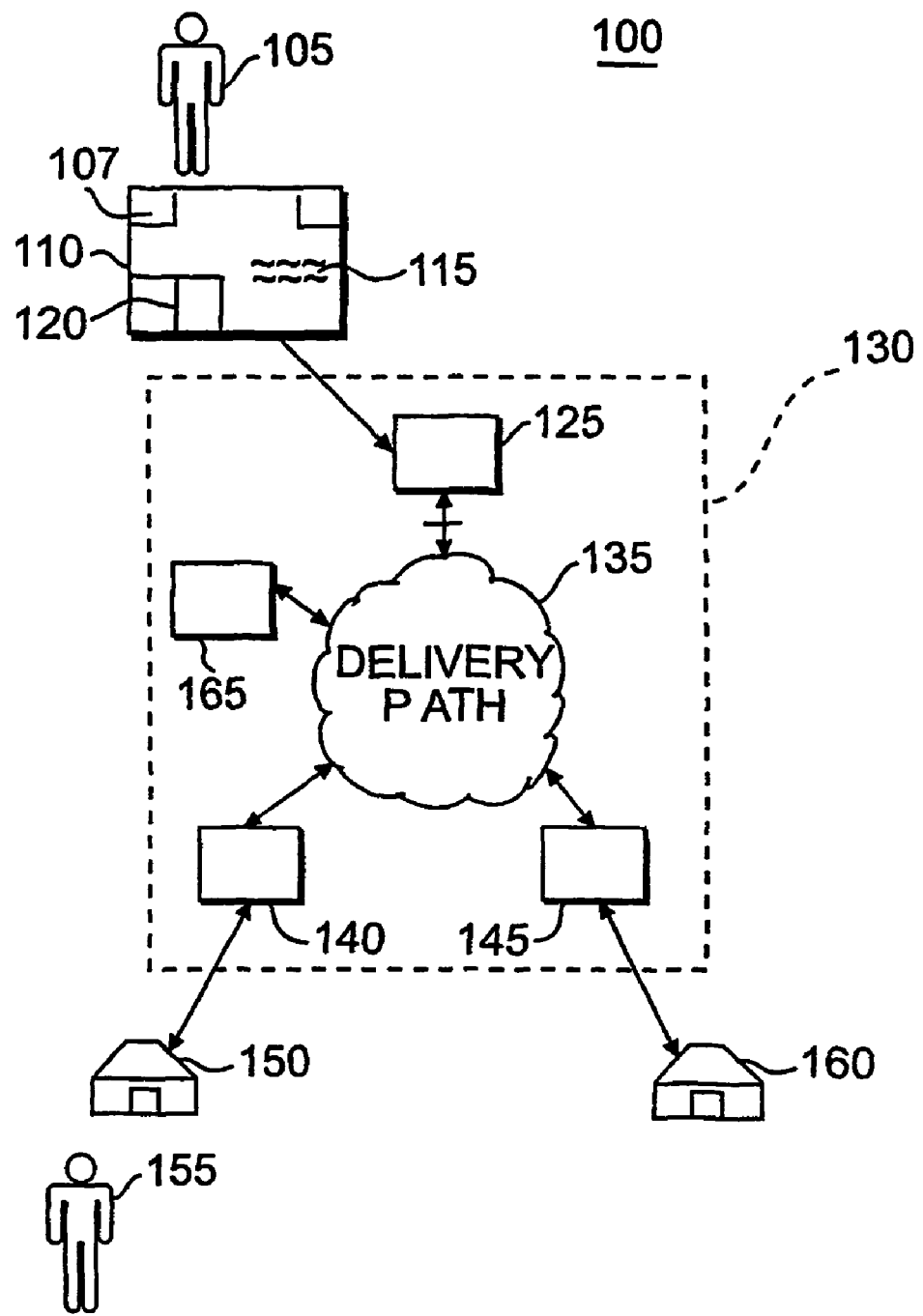
FIG. 1 is a functional block diagram of a system for providing ancillary services consistent with the present invention.

Reference will now be made to various embodiments according to this invention, examples of which are shown in the accompanying drawings and will be obvious from the description of the invention. In the drawings, the same reference numbers represent the same or similar elements in the different drawings whenever possible.

Referring to FIG. 1, an embodiment consistent with the present invention provides an ancillary services system 100 using icons. For example, a sender 105 places an item 110 into a delivery system 130. Item 110 contains address label 115 indicating a first address 150 of a recipient 155 and a return address 107 indicating where to return item 110 if necessary. Item 110 is routed through delivery system 130. Delivery system 130 comprises a sender plant 125, a delivery path 135, a first address plant 140, an alternative plant 145, and an alternative processing point 165. Delivery path 135 comprises a plurality of plants similar to sender plant 125, first address plant 140 and alternative plant 145. The plants within delivery path 135 contain, among other things, automated systems and sorting equipment and are designed to receive and process a plurality of items. Delivery system 130 is configured to sense tracking indicia placed on item 110 as it passes through the elements of delivery system 130 directing the movement of item 110 through delivery system 130.

In addition to return address 107 and address label 115, item 110 also contains an icon 120 which is placed on item 110 by sender 105 and describes the ancillary service desired by sender 105. Generally, the rules to achieve the ancillary service results are complicated and delivery system operators have difficulty correctly implementing them. To simplify the provision of ancillary services, an icon system is used in the present invention to communicate simplified instructions.

Referring to FIGS. 2A-2D, sample icons and their corresponding ancillary services will be described. FIG. 2A indicates the format of icon 120, containing an instruction section 205 and a procedure section 210. Instruction section 205 is the portion of icon 120 that comprises a symbol which indicates the particular ancillary service desired by sender 105. Procedure section 210 describes a set of procedures that are to be performed by the delivery system operator in the event the ancillary service indicated by instruction section 205 is to be performed. For example, a recycle instruction 215 may be placed in instruction section 205 as shown in FIG. 2B. In the event the ancillary service indicated by recycle instruction 215 is to be performed, item 110 would be treated as waste by the delivery system operator. In the case of recycle instruction 215, procedure section 210 is blank as indicated by recycle procedure 220 because the procedures corresponding to recycle instruction 215 are inherent. FIG. 2C indicates a NIXIE instruction 225 with its corresponding NIXIE procedure 230. As is well known to those skilled in the art, a NIXIE procedure is briefly described as classifying an item that cannot be sorted or is undeliverable-as-addressed because of an incorrect, illegible, or insufficient delivery address. NIXIE procedure 230 describes a set of procedures that are to be performed by the delivery system operator in the event the NIXIE ancillary service indicated by NIXIE instruction 225 is to be performed. Similarly, FIG. 2D indicates a computerized forwarding service (CFS) instruction 235 with its corresponding CFS procedure 240. CFS procedure 240 describes a set of procedures that are to be performed by the delivery system operator in the event the CFS ancillary service indicated by CFS instruction 235 is to be performed. The significances of NIXIE instruction 225, CFS instruction 235, and their corresponding procedures will be discussed in greater detail below with respect to FIG. 4.

In the ancillary services process, item 110 is sent through delivery system 130 by sender 105 to first address plant 140. At first address plant 140 a determination is made as to whether item 110 is deliverable to recipient 155 at address 150. If it is determined that item 110 is not deliverable to recipient 155 at address 150, the ancillary service indicated on icon 120 is performed. Examples of such ancillary services are recycle service, NIXIE service, and CFS service, all of which will described in greater detail below with respect to FIG. 4. Those skilled in the art, however, will appreciate that may other types of ancillary services may be performed within delivery system 130.

Figure 3:
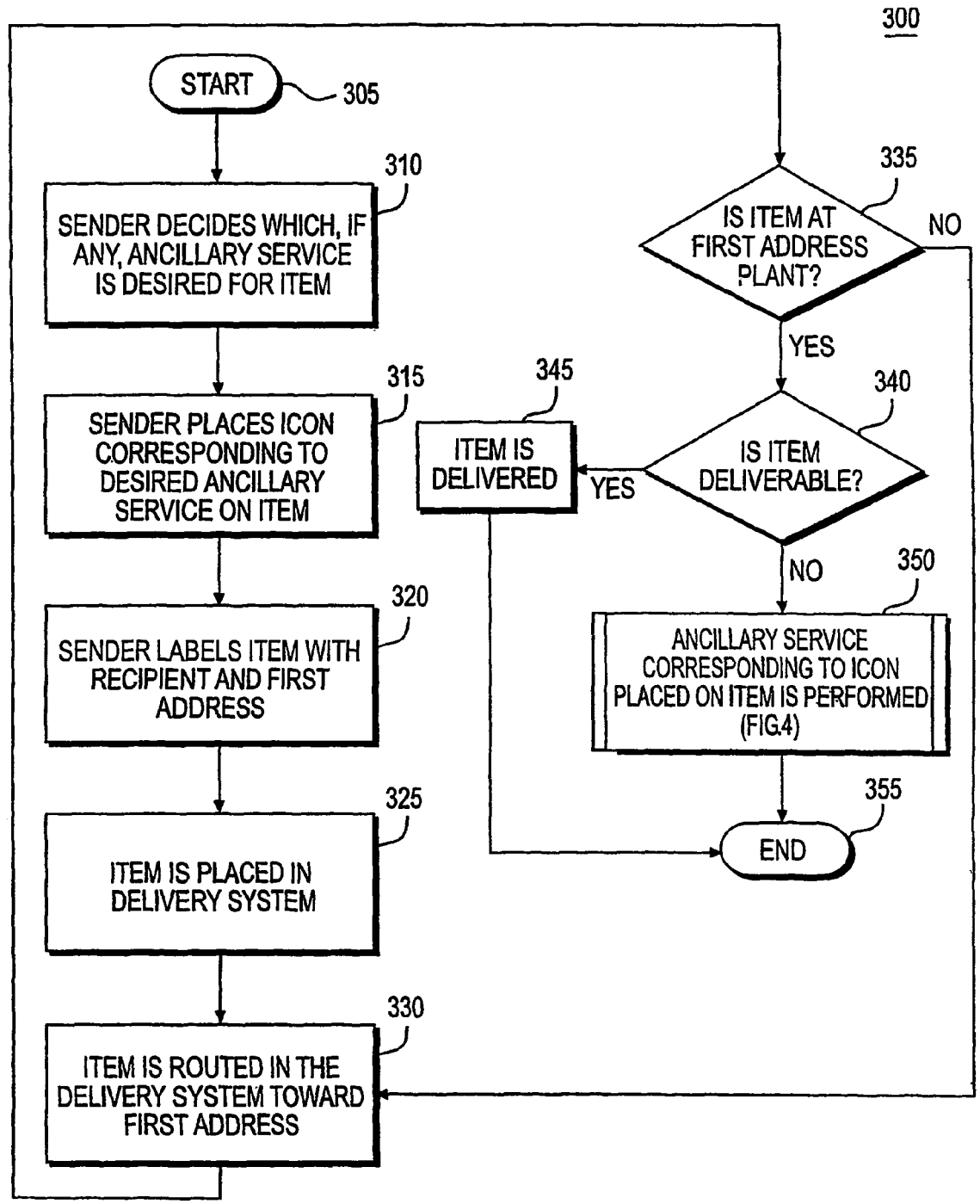
FIG. 3 is a flow chart of a method for providing ancillary services consistent with the present invention.

FIG. 3 is a flow chart setting forth the general stages involved in an exemplary method 300 for providing ancillary services in delivery system 130. The implementation of the stages of method 300 in accordance with an exemplary embodiment of the present invention will be described in greater detail with respect to FIG. 4.

Exemplary method 300 begins at starting block 305 and proceeds to stage 310 where sender 105 decides which, if any, ancillary service is desired for item 110. The ancillary service may include recycle service, NIXIE service, or CFS service. After sender 105 decides which, if any, ancillary service is desired for item 110 in stage 310, exemplary subroutine 300 advances to stage 315 where sender 105 places icon 120 corresponding to the desired ancillary service on item 110. Icon 120 is used to simplify the provisioning of ancillary services as an icon system can be used to represent and communicate simplified instructions. Sample icons are shown in FIGS. 2A through 2B as discussed above.

From stage 315 where sender 105 places icon 120 corresponding to the desired ancillary service on item 110, exemplary subroutine 300 continues to stage 320 where sender 105 labels item 110 with the name of recipient 155 and first address 150 which is the mail delivery address of recipient 155. This is accomplished by placing address label 115 on item 110 comprising the name of recipient 155 and first address 150.

Once sender 105 labels item 110 with recipient 155 and first address 150 in stage 320, exemplary subroutine 300 proceeds to stage 325 where item 110 is placed in delivery system 130. FIG. 1 shows sender 105 placing item 110 into delivery system 130 at sender plant 125. However, item 110 may be placed in sender plant 125 or any other plant within delivery system 130. Item 110 delivered through delivery system 130 may comprise a letter or any other type mailpiece, however, those skilled in the art will appreciate that many other types of items may be delivery through delivery system 130.

After item 110 is placed in delivery system 130 in stage 325, exemplary subroutine 300 advances to stage 330 where item 110 is routed in the delivery system 130 toward first address 150. Delivery system 130 comprises sender plant 125, delivery path 135, first address plant 140 and alternative plant 145. Delivery path 135 comprises a plurality of plants similar to sender plant 125, first address plant 140 and alternative plant 145. The plants within delivery system 130 may contain, among other things, automated systems and sorting equipment located at a plurality of locations. In executing their function, the plants comprising delivery system 130 process item 110 by checking address label 115 placed on item 110. Item 110 is then routed to the next most appropriate plant in delivery system 130. The appropriateness of the next plant in delivery system 130 depends upon the present location of item 110 in delivery system 130 and where item 110 is addressed. Ultimately, item 110 is routed in delivery system 130 to the plant that serves the delivery address indicated on item 110, according to established procedures. Thus item 110 is routed from plant to plant within delivery system 130 wherein item 110 efficiently converge on first address plant 140, which is the plant that serves the delivery address labeled on the item 110. Throughout this process, delivery system 130 tracks the progress of item 110 through delivery system 130.

From stage 330 where item 110 is routed in the delivery system 130 toward first address 150, exemplary subroutine 300 continues to decision block 335 where it is determined if item 110 is at first address plant 140. If it is determined that item 110 is not at first address plant 140 at decision block 335, exemplary subroutine 300 advances to stage 330 where item 110 is routed in the delivery system 130 toward first address 150 and repeats the stages of exemplary subroutine 300 as described above. If at decision block 335 it is determined, however, that item 110 is at first address plant 140, exemplary subroutine 300 advances to decision block 340 where it is determined if item 110 is deliverable. Item 110 may be undeliverable due to an incorrect, illegible, or insufficient delivery address. Those skilled in the art will appreciate that many other considerations may be taken into account in determining if item 110 is deliverable. If it is determined that item 110 is deliverable at decision block 340, exemplary subroutine 300 advances to stage 345 where item 110 is delivered. In delivering item 110, the delivery system operator transfers item 110 from first address plant 140 to first address 150. From stage 345 where item 110 is delivered, exemplary subroutine 300 continues to stage 355 where exemplary method 300 ends.

Figure 4:
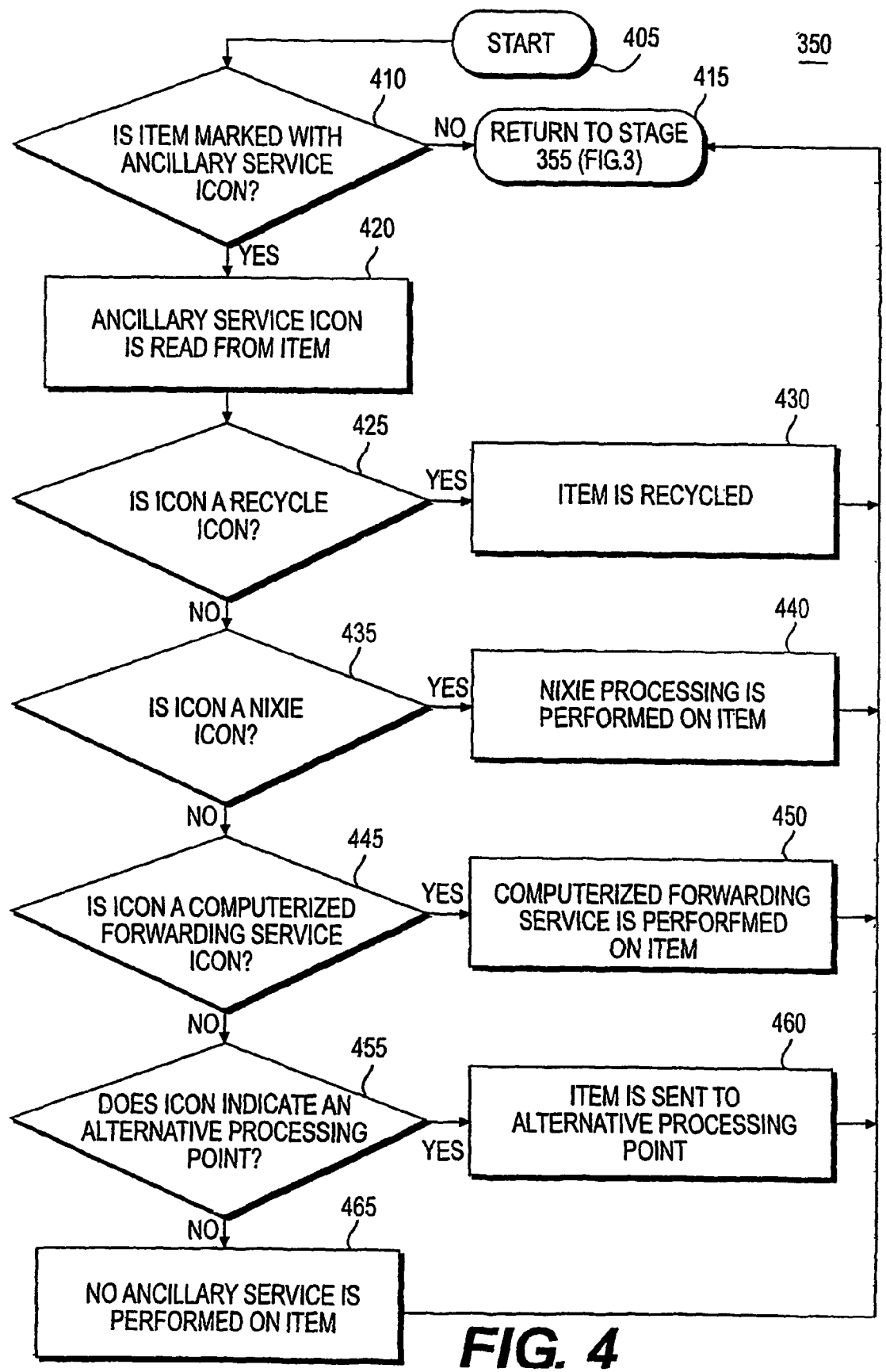
FIG. 4 is a flow chart of a subroutine used in the method of FIG. 3 for performing ancillary services corresponding to an icon placed on an item.

If at decision block 340 it is determined, however, that item 110 is not deliverable, exemplary subroutine 300 advances to subroutine 350 where the ancillary service corresponding to icon 120 placed on item 110 is performed. Before the ancillary service corresponding to icon 120 placed on item 110 is performed, a plurality of items requiring ancillary services may be collected and sorted by the type of ancillary service required. In this way, an ancillary service may be performed more efficiently on a group rather than on an item-by-item basis. For example, if a plurality of items requiring the recycling ancillary service are collected, the recycling ancillary service can be performed on the group at one time. The stages of subroutine 350 are shown in FIG. 4 and will be described in greater detail below. From subroutine 350 where the ancillary service corresponding to icon 120 placed on item 110 is performed, exemplary method 300 ends at stage 355.

Ancillary Service Corresponding to Icon is Performed

Turning now to FIG. 4, describing the exemplary subroutine 350 from FIG. 3 in which the ancillary service corresponding to icon 120 placed on item 110 is performed. Subroutine 350 begins at starting block 405 and advances to decision block 410 where it is determined if item 110 is marked with ancillary service icon 120. FIGS. 2A-2D, show sample icons with their corresponding ancillary services. FIG. 2A indicates the format of icon 120, containing instruction section 205 and procedure section 210. Instruction section 205 is the portion of icon 120 that comprises a symbol which indicates the particular ancillary service desired by sender 105. Procedure section 210 describes a set of procedures that are to be performed by the delivery system operator in the event the ancillary service indicated by instruction section 205 is to be performed.

If it is determined that item 110 is marked with ancillary service icon 120 at decision block 410, exemplary subroutine 350 advances to stage 420 where ancillary service icon 120 is read from item 110. Specifically, instruction section 205 is read by the delivery system operator. If at decision block 410 it is determined, however, that item 110 is not marked with ancillary service icon 120, exemplary subroutine 350 advances to stage 415 and returns to stage 355 of FIG. 3.

After ancillary service icon 120 is read from item 110 in stage 420, exemplary subroutine 350 advances to decision block 425 where it is determined if icon 120 is a recycle icon. If it is determined that icon 120 is a recycle icon at decision block 425, exemplary subroutine 350 advances to stage 430 where item 110 is recycled. Recycling item 110 comprises treating item 110 as waste by the delivery system operator. In the case of recycle instruction 215, procedure section 210 is blank as indicated by recycle procedure 220 because the procedures corresponding to recycle instruction 215 are inherent. From stage 430 where item 110 is recycled, exemplary subroutine 350 advances to stage 415 and returns to stage 355 of FIG. 3. If at decision block 425 it is determined, however, that icon 120 is not a recycle icon, exemplary subroutine 350 advances to decision block 435 where it is determined if icon 120 is a NIXIE icon.

At decision block 435, if it is determined that icon 120 is a NIXIE icon, exemplary subroutine 350 advances to stage 440 where NIXIE processing is performed on item 110. NIXIE is a classification given to an item 110 that cannot be sorted or is undeliverable-as-addressed because of an incorrect, illegible, or insufficient delivery address. When item 110 is undeliverable-as-addressed, address correction service (re-label with a correct address) or return service (return item to the sender) may be performed. In this case, a NIXIE operator specialized in the handling of such items is required. If item 110 requires return service, return address 107 on item 110 is read and item 110 is sent to return address 107 accordingly. Return address 107 is an element of item 110 that is usually placed in the upper left corner of item 110 to indicate the address of sender 105. This address indicates where sender 105 wants item 110 returned if it is undeliverable. In addition return address 107 may indicate where sender 105 will receive a bill for any fees due for the return of item 110. When item 110 requires address correction service, a NIXIE operator obtains the proper address of recipient 155 or the reason for non-delivery. While NIXIE processing may comprise address correction service or return service, those skilled in the art will appreciate that may other types of NIXIE processing may be performed.

From stage 440 where NIXIE processing is performed on item 110, exemplary subroutine 350 advances to stage 415 and returns to stage 355 of FIG. 3. If at decision block 435 it is determined, however, that icon 120 is not a NIXIE icon, exemplary subroutine 350 advances to decision block 445 where it is determined if icon 120 a computerized forwarding service icon.

At decision block 445, if it is determined that icon 120 is a computerized forwarding service icon 120, exemplary subroutine 350 advances to stage 450 where computerized forwarding service is performed on item 110. Computerized forwarding service is a centralized, computerized address label-generating operation that forwards undeliverable-as-addressed items to recipients. In this case, recipient 155 pre-registers an alternative address 160 of recipient 155 with the delivery system operator in order to have all items forwarded to alternative address 160. For example, when recipient 155 moves and wishes to have items sent to alternative address 160, recipient 155 notifies the delivery system operator of alternative address 160. Once the delivery system operator is notified of alternative address 160, all items sent to first address 150 are detected by the delivery system, relabeled, and then forwarded to alternative address 160. In the aforementioned computerized forwarding service, items are forwarded only for a specific period of time. The delivery system operator expects recipient 155 to contact each and every sender who recipient 155 may expect to receive an item and notify the possible senders of the address change of recipient 155. After the computerized forwarding service time period is complete, the delivery system operator will cease forwarding items to recipient 155 and will return to the sender 105 all items sent to first address 150.

From stage 450 where computerized forwarding service is performed on item 110, exemplary subroutine 350 advances to stage 415 and returns to stage 355 of FIG. 3. If at decision block 455 it is determined, however, that icon 120 is not a computerized forwarding service icon 120, exemplary subroutine 350 advances to decision block 455 where it is determined if icon 120 indicates an alternative processing point 165.

At decision block 455, if it is determined that icon 120 indicates alternative processing point 165, exemplary subroutine 350 advances to stage 460 where item 110 is sent to alternative processing point 165. Item 110 may remain at alternative processing point 165 or may be processed at an item recovery section of alternative processing point 165. Item 110 may be recovered by sender 105 or recipient 155 upon the completion of a tracer. A tracer is a form completed by sender 105 or recipient 155 to locate delayed or undelivered items. While item recovery may occur at alternative processing point 165, those skilled in the art will appreciate that may other types of processing may be performed at alternative processing point 165. From stage 460 where item 110 is sent to alternative processing point 165, exemplary subroutine 350 advances to stage 415 and returns to stage 355 of FIG. 3. If at decision block 445 it is determined, however, that icon 120 does not indicate an alternative processing point 165, exemplary subroutine 350 advances to stage 465 where no ancillary service is performed on item 110. Once it is determined that no ancillary service is to be performed on item 110 in stage 465, exemplary subroutine 350 proceeds to stage 415 and returns to stage 355 of FIG. 3.

In view of the foregoing, it will be appreciated that the present invention provides ancillary services in a delivery system using icons. Still, it should be understood that the foregoing relates only to the exemplary embodiments of the present invention, and that numerous changes may be made thereto without departing from the spirit and scope of the invention as defined by the following claims.

I claim:

1. A method for providing ancillary services, comprising:
   receiving, by sorting equipment at a first address plant, an item, an intended recipient address, and an image located on the item, the image corresponding to an alternative service for undeliverable items, the image comprising an instruction section and a procedure section;
   receiving, by the sorting equipment, an indication that the item cannot be delivered to an intended recipient at the intended recipient address;
   detecting, by the sorting equipment, the image present on the item; and
   performing the corresponding alternative service.

2. The method of claim 1, wherein the alternative service comprises at least one of the following: a recycling service, a service, and a computerized forwarding service.

3. The method of claim 2, wherein the recycling service comprises treating the item as waste.

4. The method of claim 2, wherein the service comprises at least one of the following: an address correction service and a return service.

5. The method of claim 2, wherein the computerized forwarding service comprises:
   notifying a delivery system operator of an alternative address;
   re-labeling the item with the alternative address; and
   sending the item through the delivery system to the alternative address.

6. The method of claim 1, comprising processing mailpieces addressed to the recipient at a first address.

7. The method of claim 1, wherein the instruction section comprises a symbol which indicates the alternative service.

8. The method of claim 1, wherein the procedure section comprises at least one procedure defining the alternative service.

9. The method of claim 1 further comprising placing the image on the item by a sender.

10. A system for providing alternative services, comprising:
    a delivery system configured to deliver an item to a first address plant, the item comprising an intended recipient address and an image located on the item, the image corresponding to an alternative service for undeliverable items, the image comprising an instruction section and a procedure section;
    sorting equipment for detecting when the item cannot be delivered to a recipient at the intended recipient address;
    a component for detecting the presence on the item of the image corresponding to the alternative service for undeliverable items; and
    a component for performing the alternative service corresponding to the image on the item.

11. The system of claim 10, wherein the alternative, service comprises at least one of the following: a recycling service, a service, and a computerized forwarding service.

12. The system of claim 11, wherein the recycling service comprises a component for treating the item as waste.

13. The system of claim 11, wherein the service comprises at least one of the following: an address correction service and a return service.

14. The system of claim 11, wherein the computerized forwarding service comprises:
    a component for receiving notification of an alternative address;
    a component for re-labeling the item with the alternative address; and
    a component for sending the item through the delivery system to the alternative address.

15. The system of claim 10, wherein the item comprises a mailpiece.

16. The system of claim 10, wherein the instruction section comprises a symbol which indicates the ancillary alternative service.

17. The system of claim 10, wherein the procedure section comprises a set of procedures defining the ancillary alternative service.

18. The system of claim 10 further comprising a component for placing the image on the item by a sender.

19. A method for providing alternative services including at least one of a recycling service, a service, and a computerized forwarding service, the method comprising: receiving, by sorting equipment, a mailpiece from a sender addressed to a recipient at a first address, the mailpiece comprising an image located on the mailpiece, the image comprising an instruction section and a procedure section, the instruction section comprising a symbol specifying an ancillary alternative service for undeliverable items, the procedure section comprising a set of procedures defining the specified ancillary alternative service; receiving, by the sorting equipment, an indication that the item cannot be delivered to the recipient at a first address; and performing the ancillary alternative service specified by the image; wherein: the recycling service comprises treating the item as waste, the service comprises at least one of an address correction service and a return service, and the computerized forwarding service comprises the steps of: receiving notification of an alternative address, re-labeling the item with the alternative address, and sending the item to the alternative address.

* * * * *

UNITED STATES PATENT AND TRADEMARK OFFICE
CERTIFICATE OF CORRECTION

PATENT NO. : 7,991,623 B2
APPLICATION NO. : 10/344725
DATED : August 2, 2011
INVENTOR(S) : Jacquelynn Estes It is certified that error appears in the above-identified patent and that said Letters Patent is hereby corrected as shown below:

Claim 16, col. 8, line 23, delete "ancillary" before --alternative--.

Claim 17, col. 8, line 16, delete "ancillary" before --alternative--.

Signed and Sealed this
Eleventh Day of October, 2011

David J. Kappos
*Director of the United States Patent and Trademark Office*